(12) United States Patent
Arvind et al.

(10) Patent No.: US 10,817,413 B2
(45) Date of Patent: Oct. 27, 2020

(54) HARDWARE-BASED MEMORY MANAGEMENT FOR SYSTEM-ON-CHIP (SOC) INTEGRATED CIRCUITS THAT IDENTIFY BLOCKS OF CONTINUOUS AVAILABLE TOKENS NEEDED TO STORE DATA

(71) Applicant: NXP USA, Inc., Austin, TX (US)

(72) Inventors: Kaushik Arvind, Uttar Pradesh (IN); Amrit Pal Singh, Punjab (IN); Joseph Gergen, Manchaca, TX (US); Mohit Gupta, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 38 days.

(21) Appl. No.: 16/216,160

(22) Filed: Dec. 11, 2018

(65) Prior Publication Data

US 2020/0183823 A1 Jun. 11, 2020

(51) Int. Cl.
*G06F 12/02* (2006.01)
*G06F 12/0802* (2016.01)

(52) U.S. Cl.
CPC ........ *G06F 12/023* (2013.01); *G06F 12/0292* (2013.01); *G06F 12/0802* (2013.01); *G06F 2212/1016* (2013.01); *G06F 2212/178* (2013.01)

(58) Field of Classification Search
CPC . G06F 12/0292; G06F 12/023; G06F 12/0802
See application file for complete search history.

(56) References Cited

U.S. PATENT DOCUMENTS

| | | | |
|---|---|---|---|
| 6,426,943 B1 * | 7/2002 | Spinney | H04L 12/4625 370/235 |
| 8,139,593 B2 | 3/2012 | Dravida et al. | |
| 8,312,243 B2 | 11/2012 | Balan et al. | |
| 8,949,518 B2 | 2/2015 | Vaishampayan et al. | |
| 9,055,011 B2 | 6/2015 | Li et al. | |
| 2004/0123038 A1 | 6/2004 | Shami et al. | |

OTHER PUBLICATIONS

Wilson et al., "Dynamic Storage Allocation: A Survey and Critical Review", Department of Computer Sciences, University of Texas at Austin, 78 pgs. (1995).
Diwase et al., "Survey Report on Memory Allocation Strategies for Real Time Operating System in Context With Embedded Devices", International Journal of Engineering Research and Applications (IJERA), vol. 2, Issue 3, 6 pgs. (May-Jun. 2012).
Shalan, et al., "A Dynamic Memory Management Unit for Embedded Real-Time System-On-A-Chip", Cases'00, , 7 pgs. (Nov. 2000).

* cited by examiner

*Primary Examiner* — Tammara R Peyton (57) ABSTRACT

Systems and related methods are disclosed to manage memory for an integrated circuit including a processor and logic circuitry to manage the memory. The memory includes segments available for storage of data, and the processor stores data within the memory. Logic circuitry is configured to manage the memory, forms a plurality of sections within the segments, and applies tokens to the plurality of sections. Further, for each storage operation, the logic circuitry searches the tokens to identify blocks of continuous available tokens based upon data length, selects a block from the blocks identified in the search, determines a first token for the selected block, and outputs a memory address to the processor based upon the first token. The processor stores the data at the memory address. For one embodiment, the storage operations are associated with storage of data within packets received from network communications.

20 Claims, 9 Drawing Sheets

HARDWARE-BASED MEMORY MANAGEMENT FOR SYSTEM-ON-CHIP (SOC) INTEGRATED CIRCUITS THAT IDENTIFY BLOCKS OF CONTINUOUS AVAILABLE TOKENS NEEDED TO STORE DATA

TECHNICAL FIELD

This technical field relates memory management and more particularly to on-chip memory management for system-on-chip (SoC) integrated circuits.

BACKGROUND

Memory management is important for a wide range of electronic devices and related applications and environments. Memory can be managed in multiple ways. For example, dynamic allocation of memory can be implemented in software through memory allocation functions. However, software solutions are often highly intensive with respect to instructions required by processors to implement the memory allocation functions and are often expensive in time/instructions to manage related buffer tables. For example, software solutions often scan the memory to look for most optimal memory space, but the instruction execution required for these scanning operations causes significant delays that affect the throughput of the system. This delay can cause significant degradation in performance of the system.

Other solutions have relied upon dedicated hardware to perform memory management functions. However, dedicated hardware solutions are typically inefficient due to additional overhead requirements and often result in scattered entries within the memory being managed. For example, many hardware solutions create linked lists to manage memory space and avoid software related issues by storing the address of the next data along with current data. This operation of storing addresses, then decoding the addresses and reading the next data causes significant overhead both in terms of memory usage and latency in the system.

Further prior solutions implement a descriptor approach. This descriptor approach maintains a table of pointers and stores data in the form of descriptors, where each descriptor points to the data. However, the maintenance of this table of pointers adds to the latency and memory usage overhead. Further, because the processor implementing this descriptor approach must understand the table structure, descriptor decoding logic is needed in software thereby adding undesired latency to the system.

In short, prior memory management solutions have overhead and latency problems that often cause degradation in system performance.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Systems and related methods are disclosed to manage memory for an integrated circuit. The integrated circuit includes a memory, a processor, and logic circuitry to manage the memory. The memory includes segments available for storage of data, and the processor is configured to store data within the memory. The logic circuitry is configured for each of the segments to form a plurality of sections within the segment and apply tokens to the plurality of sections. Further, for each storage operation, the logic circuitry is configured to search the tokens to identify blocks of continuous available tokens to store the data based upon its data length, select a block from the blocks identified in the search, determine a first token for the selected block, and output a memory address to the processor based upon the first token. The processor stores the data at the memory address. For one embodiment, the storage operations are associated with data within packets received through a network, and the data length for each storage operation is associated with a data length for one of the received packets. A variety of additional and/or different features and variations can be implemented.

In contrast with prior solutions, the disclosed embodiments provide unique solutions where software implemented functions are not required to manage memory and where costly, dedicated hardware is not required to track memory usage. Memory space is allocated for applications performed on-chip with respect to received data, and this allocated memory space is tracked by the application. For the disclosed embodiments, hardware dynamically manages the overall memory space by having dedicated scanners operate in parallel to locate storage space for data being received and stored. The hardware operates on received data and related storage needs and searches for continuous available sections within the memory. Preferably, a smallest located available space is used to store the data based upon its length. Further, the data length can vary from storage operation to storage operation. The hardware solutions described herein can be relatively small and can operate quickly thereby avoiding scattered buffer problems and associated overhead/latency problems suffered by prior solutions. Efficiency of memory usage is enhanced and overall performance is increased by the disclosed embodiments. While the embodiments described herein focus on data packets received through network communications, the data storage techniques are applicable more generally to the storage of data within memory over a plurality of storage operations to provide efficient data storage based upon data length, which can vary as indicated herein. Example embodiments are now described in more detail with respect to the drawings.

Figure 1A:
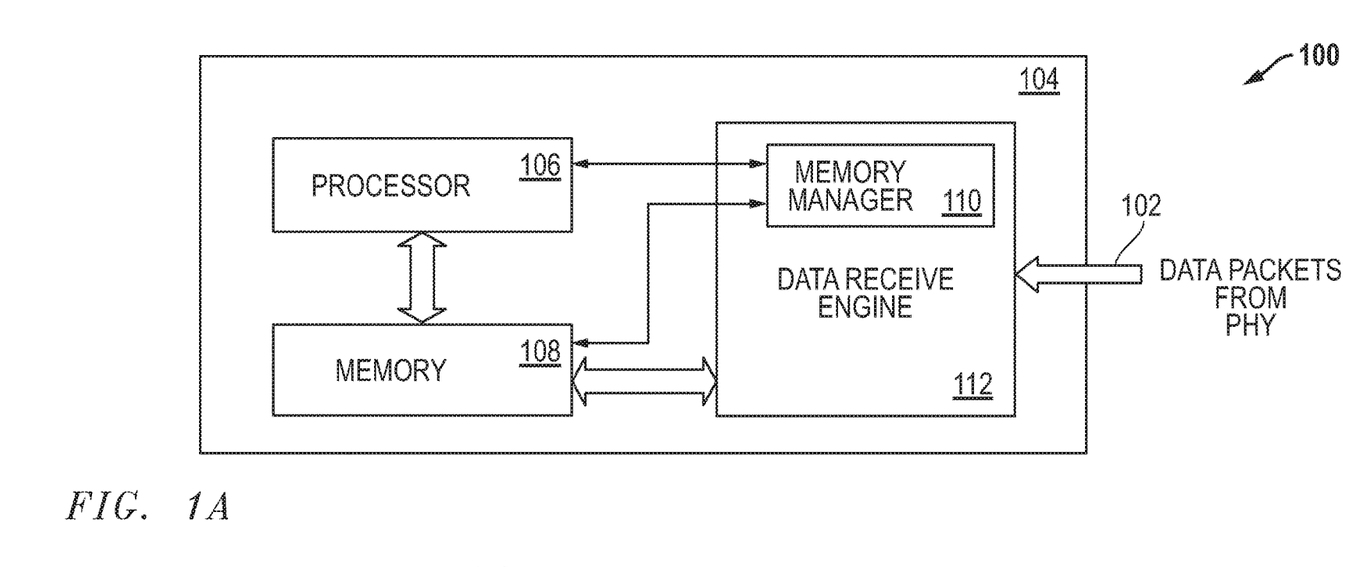
FIG. 1A is a block diagram of an example embodiment for a system including a memory manager within an integrated circuit according to the disclosed embodiments.

FIG. 1A is a block diagram of an example embodiment for a system 100 including a memory manager 110 within an integrated circuit 104. Data packets 102 from a physical interface layer (PHY) are received by a data receive engine 112, and the size of the data within the data packets 102 varies from packet to packet for certain embodiments. Based upon the size of the received data within a particular received packet, the memory manager 110 scans memory 108 to identify a memory block to store the received data and to allocate this memory block. The received data is then stored within the allocated memory block. The processor 106 then accesses stored data within the memory 108. As described in more detail herein, the memory scan for the disclosed embodiments preferably identifies the smallest continuous memory block available for storage of the received data based upon its size.

For one example embodiment, data packets having data sizes that vary from packet to packet are data packets that include media-access-control protocol data units (MPDU). For example, MPDU frames are communicated in data packets for WLAN (wireless local area network) applications using 802.11a/b/g/n/ac/ax protocols. With respect to embodiment 100 in FIG. 1A, MPDU data within incoming MPDU frames is received by the data receive engine 112 and is stored in memory 108 for later use by processor 106. The size of incoming MPDU data is known only by reading initial bytes (e.g., delimiter) of the MPDU packet. The memory manager 110 scans the memory, at the time that the packet is received, to identify the smallest contiguous memory space required to store the incoming MPDU data based on its length. In addition, the memory manager 110 releases the memory space as soon as the MPDU data is read by the processor 106 from the memory 108 so that this memory space is available for later incoming data packets 102. As such, the memory manager 110 provides reduced latency as compared to prior solutions and provides efficient use of a given memory space, avoiding the need for increased memory sizes to handle received data packets.

Figure 1B:
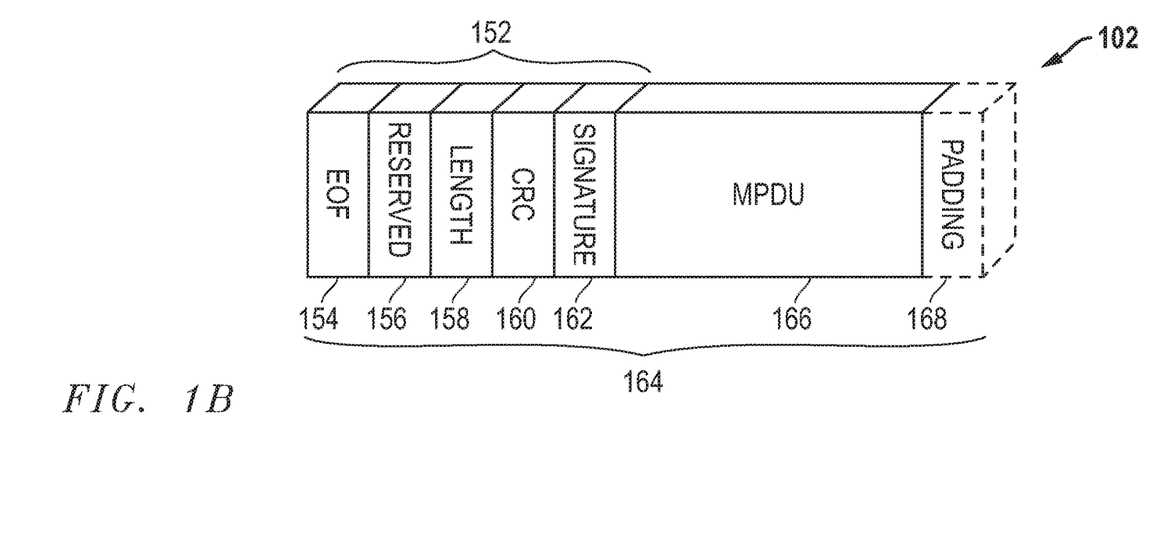
FIG. 1B is a diagram of an embodiment for a data packet that includes data having a variable length.

FIG. 1B is a diagram of an embodiment for an MPDU data packet 102 that includes MPDU data 166. The MPDU data packet 102 includes a delimiter 152 that includes multiple header fields. Field 154 includes a value representing an end-of-frame (EOF). Field 156 is reserved for later use. Field 158 includes a value identifying the length of the MPDU data packet 102. Field 160 includes a value representing CRC (cyclic redundancy check) data. Field 162 includes a packet signature. In addition to the MPDU data 166, the MPDU data packet 102 can also include padding bits 168. The length field 158 indicates the length of the MPDU data packet 102, and this length can change from packet to packet. As such, the length of a particular MPDU data packet 102 is not known by the data receive engine 112 or the memory manager 110 until the packet is received and the length field 158 is read.

Figure 2:
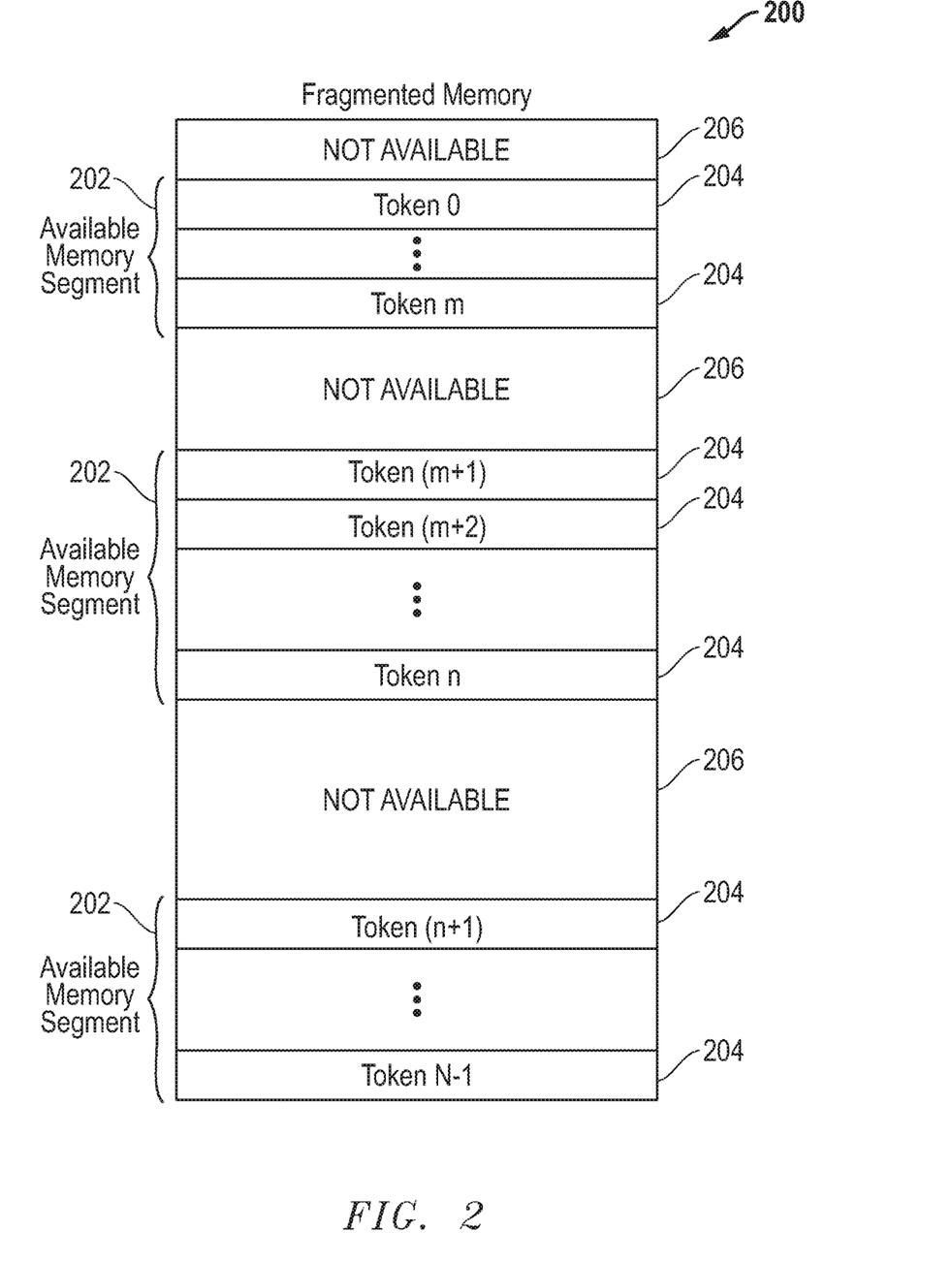
FIG. 2 is a diagram of an example for fragmented memory that has been tokenized by a memory manager according to the disclosed embodiments.

FIG. 2 is a diagram of an example for fragmented memory 200 that has been tokenized by a memory manager 110 according to the disclosed embodiments. Over time, a typical memory becomes fragmented into one or more different continuous available memory segments 202 that can be used to store data for incoming packets 102. Other memory segments 206 are not available and have already been allocated for other uses. The memory manager 110 disclosed herein divides each available memory segment 202 into memory sections 204, and each section 204 is represented by one token. The memory sections 204 within a given memory segment 202 are preferably equal in size and can be programmable based upon a token size and a number of tokens to be used. A token is an index number associated with a particular memory section 204. For the embodiment depicted, the top available memory segment 202 includes "m+1" different memory sections 204 having tokens from TOKEN (0) to TOKEN (m). The middle memory segment 202 includes "n−(m+1)" different memory sections 204 having tokens from TOKEN (m+1) to TOKEN (n). The bottom memory segment 202 includes "(N−1)−(n+1)" different memory sections 202 having tokens from TOKEN (n+1) to TOKEN (N−1). For this example, N represents a total number of tokens to be used, and these tokens can be spread across the different available memory sections 202.

The memory manager 110 operates to identify different-size blocks of continuous memory sections 204 that are available to store data for an incoming packet. From these different-size blocks, the memory manager 110 preferable selects a minimum-size block for the data within an incoming data packet 102 based upon the length of that data, which is determined after receipt of the data packet 102. As such, the data length is an input, and the base memory address for the block of continuous memory sections 204 where the packet data is to be stored is an output. After looking for available blocks of continuous memory sections 204, the memory manager 110 determines the minimum-size blocks in the memory 108 that can accommodate the length of the incoming data packet 102 and marks all the contending blocks in a scanning result vector. If space is available, a block is selected and allocated on the basis of the scanner results, and its address is returned based on priority. If no space is available in memory for the data packet 102, the memory manager 110 asserts a message indicating that memory is not available. As such, the memory manager 110 handles identification, allocation, and deallocation of the memory sections 204 dynamically based upon the length of incoming data packets.

By scanning memory 108 for available memory segments 202, organizing the available memory segments 202 into tokenized sections 204, and identifying minimum-size available blocks of tokenized sections 204 for storage of packet data based upon length of incoming packets 102, the disclosed embodiments provide advantages over prior solutions. As compared to prior software solutions, the embodiments described herein do not require the use of software-only solutions to manage memory space, thereby saving precious instruction cycles. Further, as compared to prior hardware solutions, there is no need to store additional addresses/pointers to next data along with current data, thereby avoiding any additional overhead on memory usage. Still further, as compared to descriptor solutions, there is no need to maintain a pointer/address table or to add decoding logic to understand the pointer/address table, thereby avoiding any overhead on memory usage and latencies. As such, efficiency of memory usage is enhanced from and overall performance is increased by the disclosed embodiments.

It is noted that a token is an index number of a particular memory section within a programmable number of tokens (N) where the index number ranges from 0 to N−1. The size of each memory section 204, as represented by each token, can also be a programmable size. The token size refers to this size of each tokenized memory section 204. Token width refers to the number of bits used to represent each token. For example, where 4096 tokens are used, the token width is 12 bits. A token vector refers to the bit vector used to signify the availability of sections 204 within memory segments 202. For example, one bit can be used to identify the availability of each tokenized section 204 (e.g., logic one indicates available, logic zero indicates not available). Where 4096 tokens are used, the token vector can be 4096 bits [4095:0] where one bit is used in indicated availability for each section 204 associated with each of the 4096 tokens. During operation, parallel scanners for the memory manager 110 scan the token vector, in parallel, looking for continuous available tokens. Further, each scanner can be configured to search for a different number of continuous available tokens. An output vector is then generated by each scanner that marks the continuity of available tokens that satisfy the desired number of available tokens, for example, by marking a bit (e.g., logic one) for the start of continuous sections within the token vector. For example, where there are 4096 bits in the initial token vector, the output vector will also have 4096 bits with bits being set (e.g., logic one) only for tokens at the start of continuous available sections and other bits not being set (e.g., logic zero). Thus, the output vector provides an indication of all available blocks of continuous available tokens, and different output vectors can be generated by the different scanners.

Figure 3:
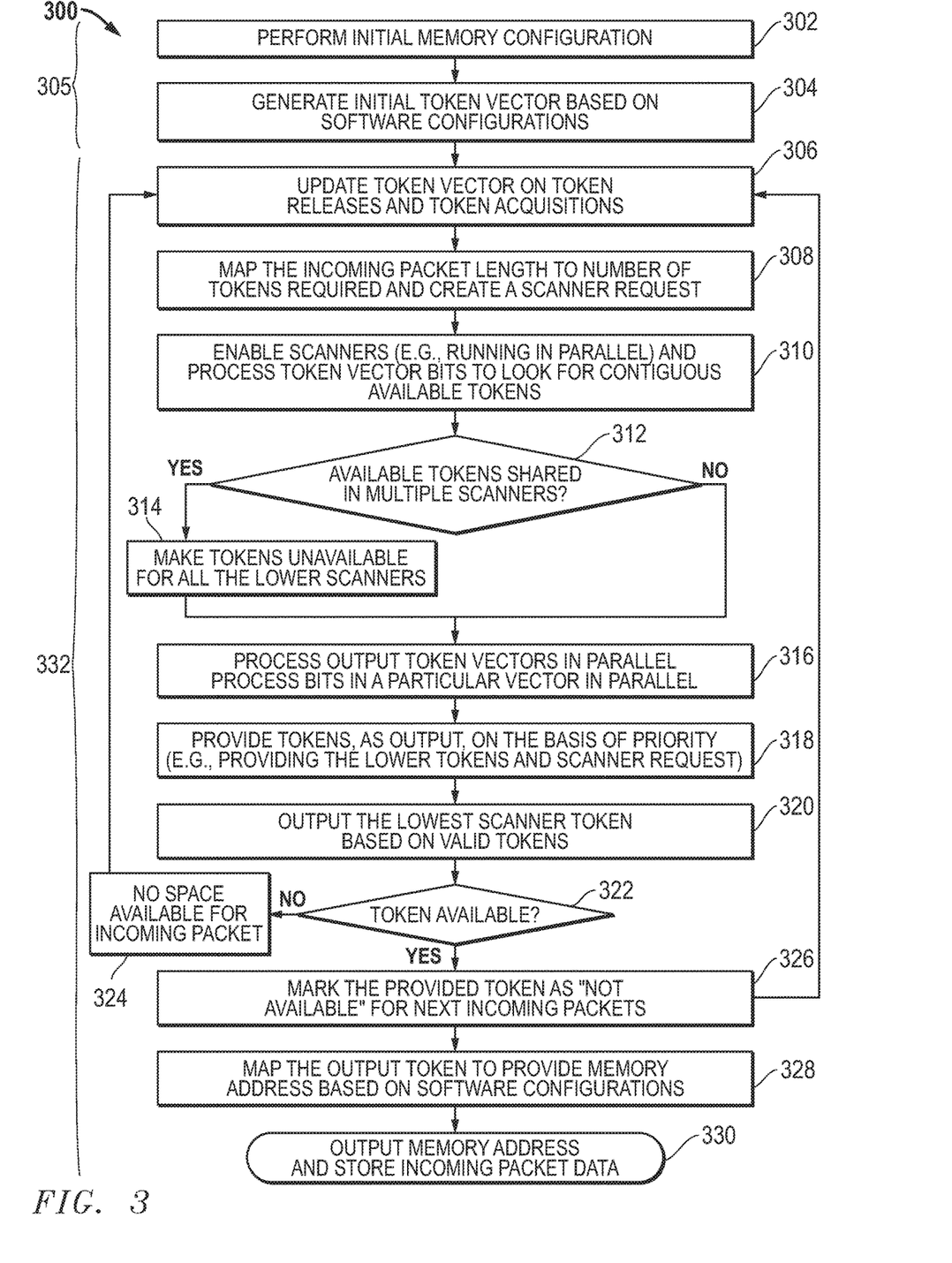
FIG. 3 is a flow diagram of an example embodiment for the memory management using tokenized sections of available memory.

FIG. 3 is a flow diagram of an example embodiment 300 for the memory management using tokenized sections of available memory according to the techniques described herein. For the example embodiment 300, there is an initial configuration phase 305 followed by a memory allocation phase 332 for incoming packets.

Within the initial configuration phase 305, an initial memory configuration is performed in block 302. For example, software instructions can be executed by the processor 106 to perform the initial memory configuration for operation of the system. In block 304, an initial token vector is generated based upon the software configuration and the initialized memory for the system. The memory allocation phase 332 is then entered.

In block 306, the token vector is updated based upon token releases (e.g., by the processor releasing memory sections) and token acquisitions (e.g., by token allocation). In block 308, incoming packet length is mapped to number of tokens required for storage and a scanner request is created. This scanner request can be, for example, a request for an available memory segment with an optimal size of continuous tokens that provides the smallest needed amount of memory to store the packet length of data for the incoming packet. In block 310, scanners are enabled and preferably run in parallel to process the bits of the token vector to look for contiguous available tokens. The scanners can be configured to search for different numbers of available continuous sections and can be prioritized from low to high based upon these relative search numbers (e.g., 1, 2, 4, 8, 12, 16). In block 312, a determination is made whether available tokens are shared by multiple scanners. If the determination is "NO," then flow passes to block 316. If the determination is "YES," then block 314 is reached where tokens for all lower priority scanners are made unavailable, thereby allowing the highest priority scanner to determine token allocation where there are shared available tokens. Block 316 is then reached.

In block 316, the output vectors from the scanners are processed in parallel, and the bits with a particular output vector can also be processed in parallel. In block 318, tokens are provided as an output on the basis of priority. For example, priority can be based upon providing tokens from lower scanners first (e.g., with respect to number of continuous available tokens being searched), priority of scanner requests, and/or other priority considerations. In block 320, the tokens from the lowest scanner having valid tokens is provided as an output. It is noted that tokens from non-lowest scanners could also be used if different priority considerations are implemented. In block 322, a determination is made if available tokens were located by the scanners. If "YES," then block 326 is reached. If "NO," then block 324 is reached where a warning message is reported that there is no space available for the incoming packet. Flow then passes back to block 306 for processing of the next packet. In block 326, the tokens provided for storage of the current incoming packet are marked as "not available" for the next incoming packet. Flow then passes back to block 306, and flow also proceeds to block 328.

In block 328, the tokens selected to store the packet data are mapped to provide a memory address based upon software configurations. In block 330, this memory address is output, and the data for the incoming packet is stored at the memory address. Flow then passes back to block 306 for processing of the next packet.

It is noted that additional and/or different process steps could also be used than provided in example embodiment 300 while still taking advantage of the memory management techniques described herein.

Figure 4:
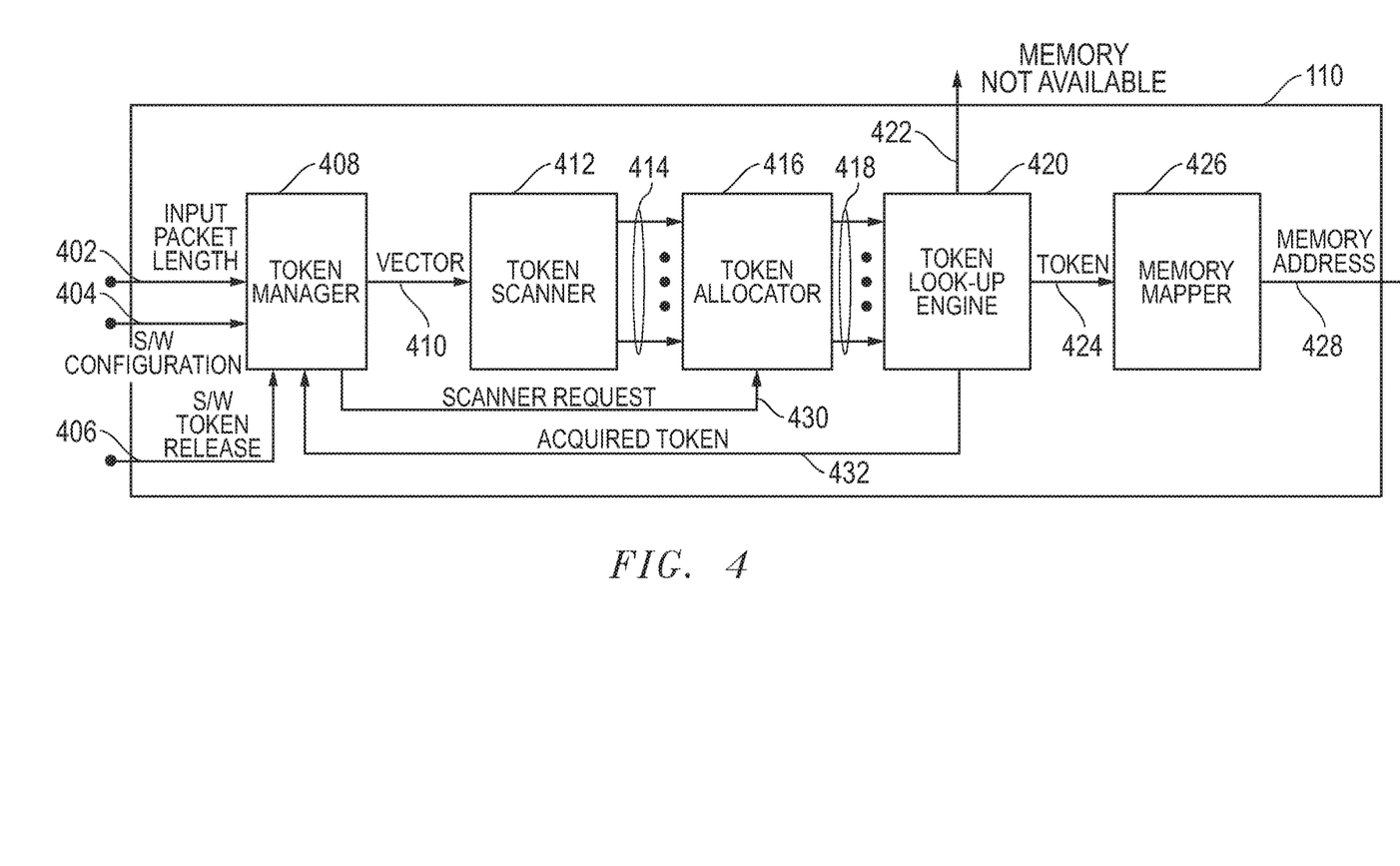
FIG. 4 is a block diagram of an example embodiment for a memory manager that searches for and identifies tokens for available memory segments where data for incoming packets can be efficiently stored.

FIG. 4 is a block diagram of an example embodiment for a memory manager 110 that searches for and identifies tokens for available memory segments where data for incoming packets can be efficiently stored according to the techniques described herein. For the example embodiment depicted, the memory manager 110 includes a token manager 408, a token scanner 412, a token allocator 416, a token look-up engine 420, and a memory mapper 426.

The token manager 408 receives as an input the packet length 402 for an incoming packet. The token manager 408 also receives as an input the software (S/W) configuration 404 for memory being used by the system to store packet data. Further, once allocated memory is no longer needed by the software applications, the token manager 408 also receives token release message 406 from software applications. For example, a processor executing instructions for the software applications can provide the inputs 404 and 406. The token manager 408 outputs an initial token vector 410 to the token scanner 412. An example token vector 410 is provided in below with respect to corresponding token values where 4096 tokens are used, where a 12-bit value is used to identify a token location, and a single bit is used to identify whether a token is available for storage of data (e.g., logic 0 for not available, logic 1 for available).

TABLE

EXAMPLE TOKEN VECTOR

| TOKEN VALUE (12-BIT) | TOKEN VECTOR [4095:0] |
|---|---|
| 0 | 0/1 |
| 1 | 0/1 |
| . . . | . . . |
| 4094 | 0/1 |
| 4095 | 0/1 |

The token scanner 412 performs multiple scans of the token vector 410 in parallel to identify continuous available tokens with each scanner searching for a different number of continuous available tokens. Output vectors 414 from the scanners for available continuous tokens are then provided to the token allocator 416. The token allocator 416 also receives a scanner request 430 from the token manager 408 including the packet length 402, and the token allocator 416 analyzes the output vectors 414 in parallel to identify blocks of continuous available tokens that can be used to store the data for the incoming packets. The token search results 418 include these blocks of tokens and are output to the token look-up engine 420. The token look-up engine 420 analyzes the token search results 418 and applies priority considerations along with optimal size considerations to select a block of available tokens to use for storage, assuming there are enough continuous available tokens.

If there are not enough continuous tokens to store the data based upon the packet length 402, the token look-up engine 420 generates a warning message 422 indicated that memory is not available. If enough continuous tokens were found to store the data for the incoming packet, the token look-up engine 420 identifies a first token 424 for the first memory section of the selected block of tokens to be used to store the data for the incoming packet. The token look-up engine 420 then sends a message 432 to the token manager with update information for the acquired token, and the token manager updates the token vector 410 appropriately before providing it for the next packet being processed. The memory mapper 426 receives the first token 424, maps it to the memory address for the memory, and outputs the memory address 428. A processor can receive the memory address 428 and use it to store the data for the incoming packet in memory.

For one example embodiment, the memory mapper 426 converts the token 424 to a memory address using software configuration fields such as base address and token size. For example, the memory address can be calculated as:

$$\text{Memory Address} = B + (T-I) * S \quad \text{[Equation 1]}$$

For this equation, "B" is the base address of the memory segment in which acquired token lies; "I" is the initial token value (e.g., 12-bit value) in this memory segment; "T" is the token value acquired (e.g., 12-bit value); and "S" is the token size in this memory segment. As described above, the memory address is used to store the data for the incoming packet in memory.

The memory manager 110 is preferably implemented as hardware including logic circuitry (e.g., interconnected logic gates formed with transistor logic) configured to perform the memory management functions described herein. As described herein, the memory manager 110 scans the memory in a parallel manner at the time of packet is received. The search algorithm for the scan preferably looks for the smallest contiguous memory space required to store the incoming data, thereby minimizing the number of holes created in memory and accommodating a maximum number of packets in memory. The memory manager 110 also releases the memory space as soon as the data is being fetched by the processor so that it is available for next incoming packets. This release allows for efficient use of a given memory space, thereby avoiding a need of a bigger memory to store incoming packets.

For one example embodiment, six (6) scanners are used along with two (2) memory segments that are tokenized into sections with 4096 tokens. A clock have 1 gigahertz (GHz) is used to clock the logic circuitry within the memory manager 110. One scan request for an incoming packet is handled at a time. Three (3) memory release requests are handled at a time in parallel. Variations can be implemented.

Figure 5:
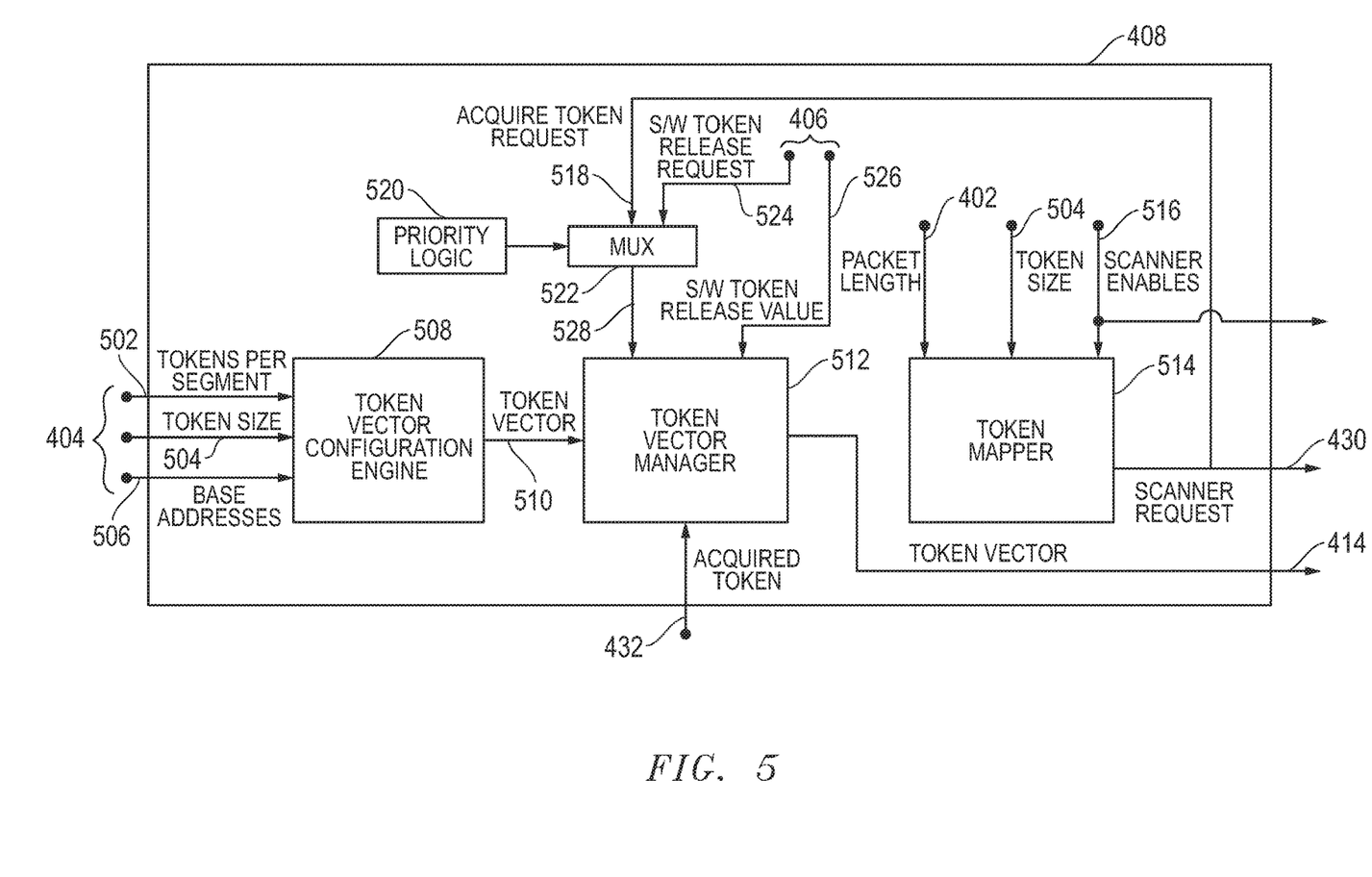
FIG. 5 is a diagram of an example embodiment for the token manager for the embodiment of FIG. 4.

FIG. 5 is a diagram of an example embodiment for the token manager 408. The token manager 408 includes a token vector configuration engine 508, a token vector manager 512, and a token mapper 514. The token vector configuration engine 508 receives software configuration information 404 including tokens-per-segment 502, toke size 504, and base addresses 506. The token vector configuration engine 508 outputs an initial token vector 510 to the token vector manager 512. The token vector manager 512 receives the output 528 of multiplexer (MUX) 522, and this output 528 is selected between the software (S/W) token release request 524 and an acquire token request 518 based upon the scanner request 430. The software token release request 524 is based upon the token release message 406, which also provides software (S/W) release value 526 to the token vector manager 512. The selection made by multiplexer 522 is based upon priority logic 520, and priority logic 520 can be configured to prioritize release requests over acquisition requests. The token vector manager 512 adjusts the initial token vector 510, for example, based upon token release requests 524, and the token vector manager 512 outputs the token vector 414. The token mapper 514 receives the packet length 402, the token size 504, and scanner enable signals 516. The token mapper 514 outputs the scan requests 430. In operation, the token manager 408 configures the initial token vector 510 and continuously updates the token vector 414 to reflect its current status and thus memory availability.

On receiving the packet length 402, the token mapper 514 generates an acquire token request 518 associated with the scanner request 420 and provides the acquire token request 518 to token vector manager 512 through multiplexer 522. If there is any conflict between a software token release request 524 and an acquire token request 518, for example, where both requests are received in same cycle, the priority logic 520 determines the request that will be served first. For example, the priority logic 520 can be configured to give higher priority to the token release request 524 as compared to the acquire token request 518. With this priority configuration for the priority logic 520, the token vector 414 will be updated such that tokens are released first based upon token release requests 524, and then those released tokens will be shown as available tokens for acquire token requests 518 in subsequent cycles. Different and/or additional priority logic could also be implemented while still taking advantage of the techniques described herein.

It is noted that the base address 506 of each memory segment can be programmed through software configuration 404 as is the number of tokens in each memory segment and the token size. It is noted that each memory segment can have a different number of tokens, and the total number of tokens (N) is the sum of the number of tokens for the memory segments. Each segment can also have a different token size; however, the size of tokens within a given segment is the same. The token vector 414 is a bit vector where each bit corresponds to a token and indicates whether it is available. For example, a logic zero can be used to indicate a token that is not available, and a logic one can be used to indicate a token that is available. Different logic states or data structures could also be used while still taking advantage of the techniques described herein.

The token vector manager 512 is responsible for updating the token vector 414 to reflect the current status of the token vector 414 and hence the status of memory available. The token vector manager 512 updates the token vector 414 on each token acquisition to mark the acquired token as unavailable for next token scan requests. A value (t) for the acquired token comes from message 432 sent by the token look-up engine 420 once a token 424 has been selected for storage, and number (n) of tokens acquired is received as part of the scan request 430 from the token mapper 514. The token vector manager 512 then marks "n" continuous tokens starting from token value "t" as unavailable.

The token release message 406 from software operations during run-time can occur whenever the processor reads data from a particular token and wants to free up the memory making it available for other incoming data. The token release message 406 includes a token value (e.g., 12-bit value) representing the released base token (t) and the number (n) of tokens to be released. The number of tokens released can be based upon a number of possible tokens to be used within scan requests. For one example embodiment, the number of tokens that can be used in a scan request could be set to be 1, 2, 4, 8, 12, or 16 tokens. After receipt of the release request through a token release message 406, the token vector manager 512 will release "n" continuous tokens starting from the base token (t). An updated token vector 414 is then output.

The token mapper 514 provides scan requests 430 to scanners within the token scanner 412. The scan requests 430 can include requests to scan for different numbers of continuous available tokens with respect to different scanners (e.g., 1, 2, 4, 8, 12, 16 tokens). The scanner enable signals 516 are used to enable or disable the scan requests for particular scanners. The packet length 402 is used to determine the number of tokens required to store a given amount of data. For example, the following equation can be used:

$$\text{Number of tokens} = \text{CEIL}[(\text{Packet length})/(\text{Token size})] \quad \text{[Equation 2]}$$

where CEIL(x) represents a function that returns the smallest integer value that is not less than "x." The scan requests 430 can then be generated based upon the number of tokens needed. For one example embodiment, scan requests can be set to be 1, 2, 4, 8, 12, or 16 tokens.

Figure 6:
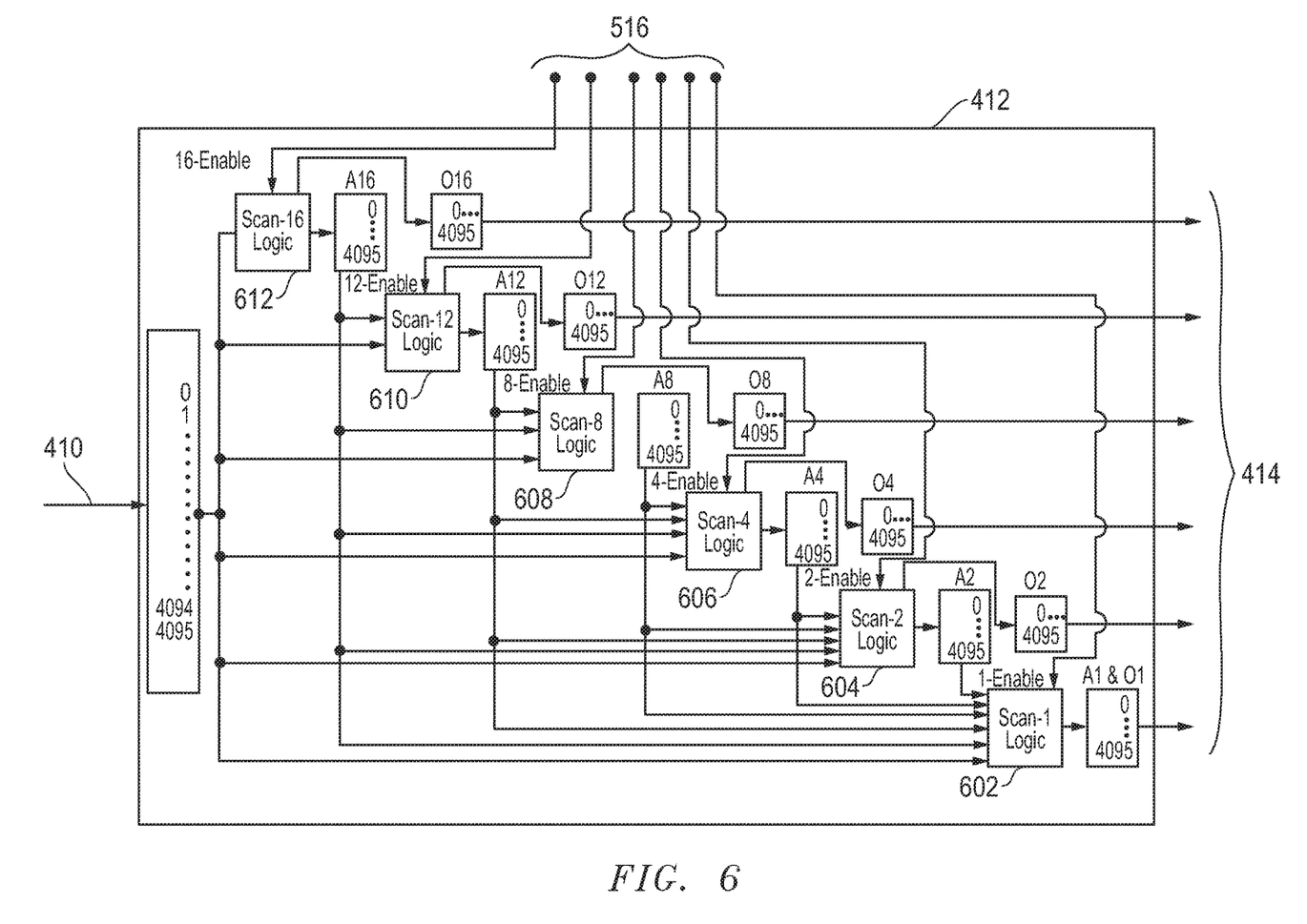
FIG. 6 is a diagram of an example embodiment for the token scanner for the embodiment of FIG. 4.

FIG. 6 is a diagram of an example embodiment for the token scanner 412 for the embodiment of FIG. 4. The token vector 410 is received by the token scanner 412 and includes 4096 tokens for this embodiment (e.g., from Token 0 to Token 4095). The token scanner 412 is responsible for scanning the token vector 410, looking for continuous available tokens. Once these are found, the locations for these continuous tokens are marked for further processing. The token scanner 412 also receives scanner enable signals 516. The token vector 410 is input to all scanners 602, 604, 606, 608, 610, and 612. The scanners are ordered from low to high where each scanner scans for a different number of continuous available tokens. For example, the scanner 602 scans for 1 continuous available token. Scanner 604 scans for 2 continuous available tokens. Scanner 606 scans for 4 continuous available tokens. Scanner 608 scans for 8 continuous available tokens. Scanner 610 scans for 12 continuous available tokens. Scanner 612 scans for 16 continuous available tokens. Although six (6) scanners are used for this embodiment, different numbers of scanners could also be used.

Each scanner 602, 604, 606, 608, 610, and 612 includes logic to scan for "n" continuous available tokens such that those "n" available tokens are not a part of continuous "n" tokens identified by of higher scanners. Each enabled scanner 602, 604, 606, 608, 610, and 612 scans the token vector 410 and creates a modified vector that removes "n" tokens identified by high scanners from consideration. For example as shown in FIG. 6, each lower scanner receives a modified vector (A16, A12, A8, A4, A2) that includes the scanning results of the previous higher scanner. These modified vectors are then used along with the token vector 410 to create the output vectors (O16, O12, O8, O4, O2, O1) 414 that identify each block of "n" continuous tokens that were identified. For one example embodiment, the first token within each block of "n" tokens can be marked (e.g., with a logic one) and the other tokens can be unmarked (e.g., with a logic zero). In the case of overlapping blocks of "n" continuous tokens, all possible combinations can be marked. Again, a vector of 4096 bits can be used for this example embodiment. Each of the output vectors 414 from the enabled scanners are provided to the token allocator 416.

Figure 7:
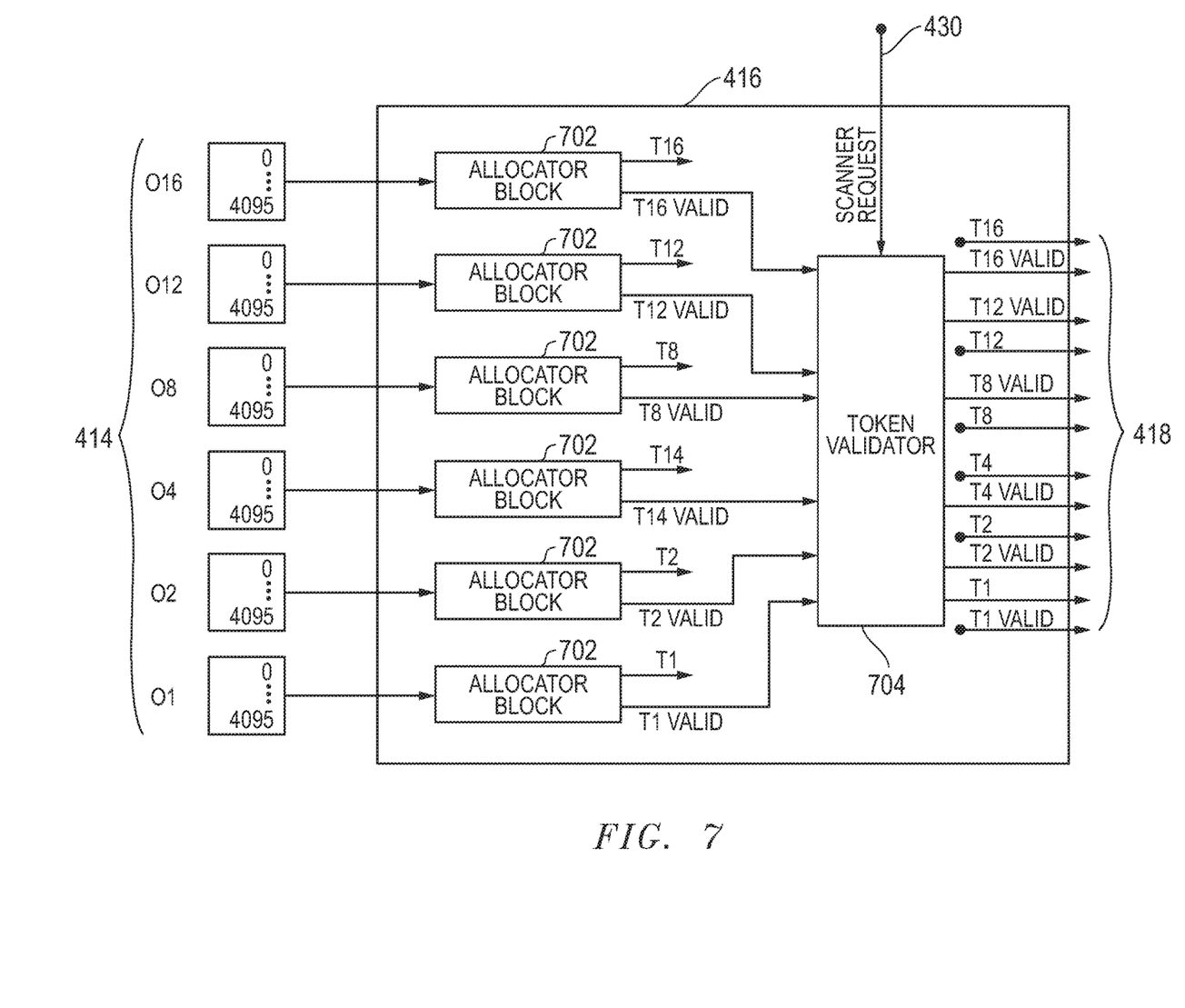
FIG. 7 is a diagram of an example embodiment for the token allocator for the embodiment of FIG. 4.

FIG. 7 is a diagram of an example embodiment for the token allocator for the embodiment of FIG. 4. The token allocator 416 is responsible for finding the first available token pertaining to a particular scanner. The output vectors 414 from the enabled scanners within the token scanner 412 are received by the token allocator 416 and processed in parallel by allocator blocks 702. The token validator 704 receives search valid indicators (e.g., 1-bit value for T1, T2, T4, T8, T12, T16) from the allocator blocks 702, receives the scanner request 430, and determines whether enough continuous available tokens have been located to store the packet data associated with the scanner request 420. The token allocator 416 outputs token token search results 418 including a token (e.g., 12-bit value for T1, T2, T4, T8, T12, T16) for each of the output vectors 414 along with a token valid indicator (e.g., 1-bit value for T1, T2, T4, T8, T12, T16) associated with the scanner request 430 received from the token manager 408. The token valid indicator identifies whether a storage location matching the scanner request 430 was successfully identified, and the token identifies the first section for the located storage location. Further, outputs from lower scanners that include outputs from higher scanners are invalidated in the token search results 418. These token search results 418, as modified to remove invalid lower scan results, are output to the token look-up engine 420.

Figure 8:
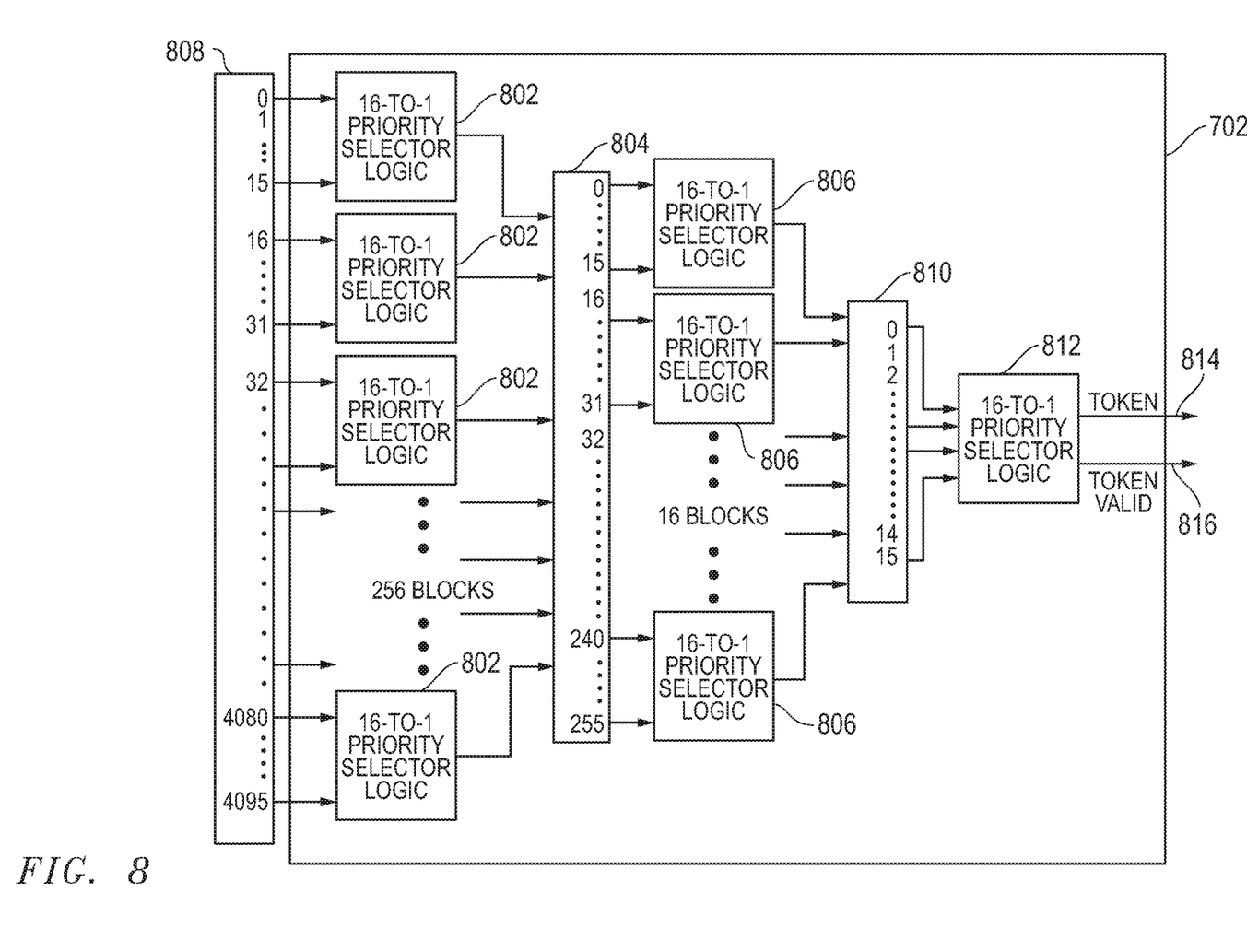
FIG. 8 is a diagram of an example embodiment for the allocator blocks for the embodiment of FIG. 7.

FIG. 8 is a diagram of an example embodiment for the allocator blocks 702 for the embodiment of FIG. 7. The vector 808 represents one of the output vectors (O16, O12, O8, O4, O2, O1) 414 received by the particular allocator block 702 as shown in FIG. 7. Priority selector logic 802 is then applied to each 16-bits of the vector 814, and this 16-to-1 selection creates a 256-bit vector 804. Priority selector logic 806 is then applied to each 16 bits of the 256-bit, and this 16-to-1 selection creates 16-bit vector 810. Priority selector logic 812 is then applied to this 16-bit vector 810, and this 16-to-1 selection creates an output token 814 for the allocator block 702. In addition, a token valid indictor 816 is also indicated for the allocator block 702 if at least one valid token was located within the vector 808.

Figure 9:
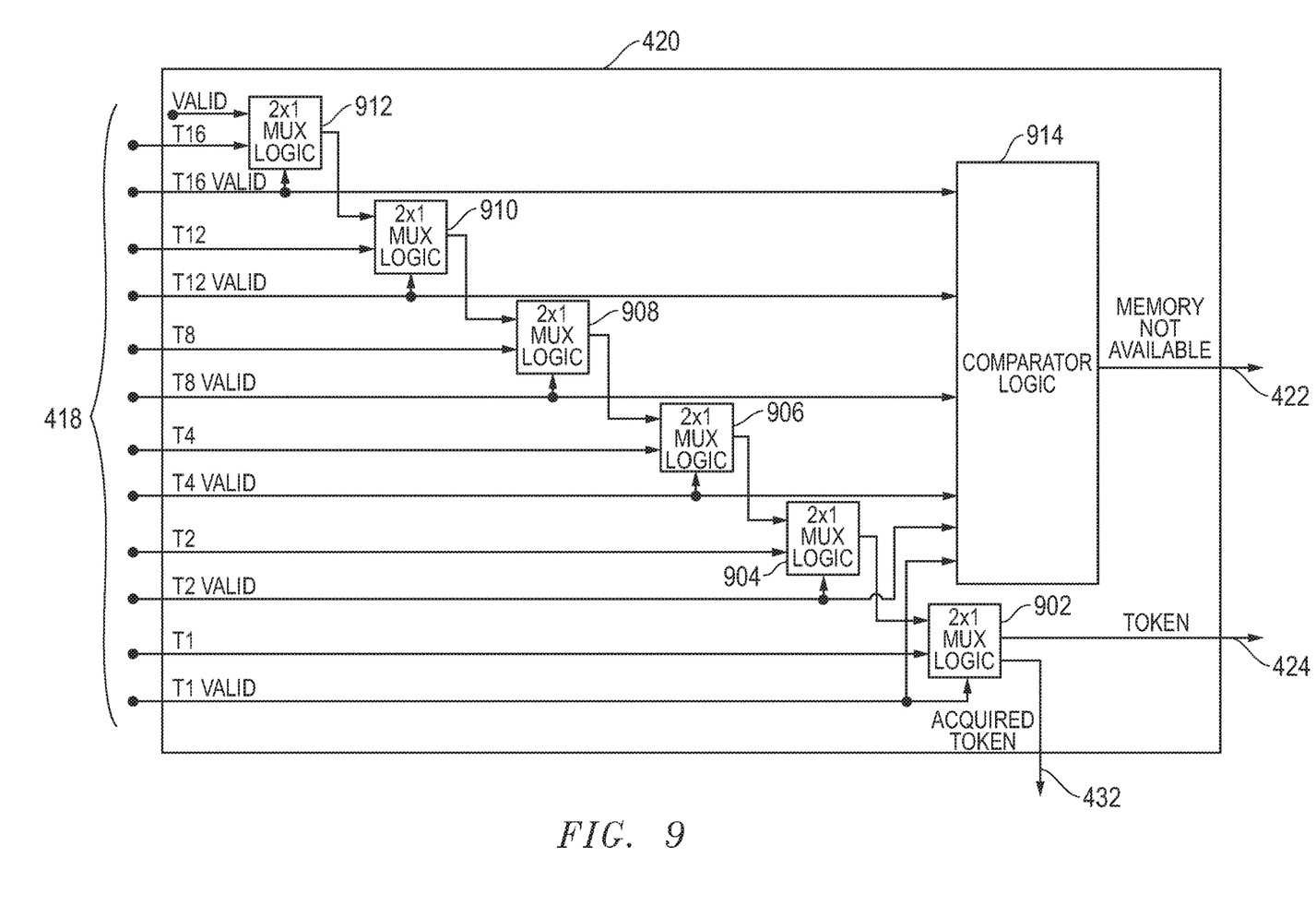
FIG. 9 is a diagram of an example embodiment for the token look-up engine for the embodiment of FIG. 4.

FIG. 9 is a diagram of an example embodiment for the token look-up engine 420 for the embodiment of FIG. 4. The token look-up engine 420 receives and analyzes the token search results 418 from the token allocator 416, and the token look-up engine 420 selects a token 424 for storage of the incoming packet data based upon priority considerations. For the logic circuitry in the example embodiment of FIG. 9, 2-to-1 multiplexing (MUX) logic 902/904/906/908/910/912 is provided for the outputs in the token search results 418 associated with each scanner 602/604/606/608/610/612. The token from each higher level MUX logic is provided to the next lower level MUX logic. The highest level MUX logic 912 receives a fixed VALID input as an additional input. Outputs from the lowest level MUX logic 902 provide the selected token 424 for storage of the packet data and the message 432 with the acquired token information. The comparator logic 914 receives the token valid indicators (T1, T2, T4, T8, T12, T16) and outputs the warning message 422 where no memory is available.

For one example embodiment, the priority determined by the MUX logic 902/904/906/908/910/912 is to locate the smallest one of the blocks of continuous available tokens identified within the token search results 418. To accomplish this, the first valid token output by the scanner searching for the smallest number of continuous available tokens that will fill the scan request 420 is selected for output as token 424. For example, if the scan request 430 requests four (4) tokens to store the data, then a valid token from a scanner looking for four (4) continuous available tokens would be selected before a valid token from a scanner looking for eight (8) or more continuous available tokens. Looking to FIG. 9, the MUX logic 906 would have priority over MUX logic 908, 910, and 912, and token valid indicators (T1, T2) to MUX logic 902 and 904 would be set invalid. This operation helps to minimize holes in memory.

Looking back to FIG. 4, once a block of continuous available token are selected, the first token 424 for this block is output to the memory mapper 426, and a message 432 is sent to the token manager 408 with the acquired token information. The token manager 408 then updates the current status of the token vector 410 with this acquired token information.

As described herein, a variety of embodiments can be implemented and different features and variations can be implemented, as desired.

For one embodiment, an integrated circuit is disclosed including a memory having one or more segments available for storage of data, a processor coupled to the memory to store data within the memory based upon memory addresses, and logic circuitry coupled to the processor and the memory. The logic circuitry is configured for each of the one or more segments of the memory to form a plurality of sections within the segment and to apply tokens to the plurality of sections such that a different token is associated with each of the plurality of sections and each token indicates whether its associated section is available to store data. The logic circuitry is also configured, for each of a plurality of storage operations, to search the tokens to identify blocks of continuous available tokens to store data having a data length that determines how many continuous available tokens are needed to store the data, to select a block from the blocks identified in the search, to determine a first token for the selected block, and to output a memory address to the processor based upon the first token.

In additional embodiments, the plurality of storage operations are associated with data within packets received through a network, and the data length for each storage operation is associated with a data length for one of the received packets.

In additional embodiments, the logic circuitry is further configured to generate a token vector having a bit for each token. In further embodiments, a logic state for the bit for each token is configured to indicate whether its associated section is available to store data.

In additional embodiments, the logic circuitry is configured to search for continuous tokens having a same logic state to identify blocks of continuous available tokens to store the data. In further additional embodiments, the logic circuitry is further configured to update the tokens for the plurality of sections based upon tokens released by the processor. In still further embodiments, the logic circuitry is further configured to prioritize processing of released tokens before search for tokens to identify blocks of continuous available tokens.

In additional embodiments, the logic circuitry is further configured to select a smallest of the blocks identified in the search. In further additional embodiments, the logic circuitry is further configured for each storage operation to update the tokens for the plurality of sections based upon the first token for the selected block.

In additional embodiments, the memory includes a plurality of segments available for storage of data, and the logic circuitry is further configured to form a plurality of sections within each segment based upon a programmable number of tokens and a programmable token size for each segment.

For one embodiment, a method to operate an integrated circuit is disclosed including storing, with the processor, data within a memory based upon memory addresses where the memory includes one or more segments available for storage of data. For each of the one or more segments of the memory, the method also includes operating logic circuitry coupled to the processor and the memory to form a plurality of sections within the segment and to apply tokens to the plurality of sections such that a different token is associated with each of the plurality of sections and each token indicates whether its associated section is available to store data. Further, for each of a plurality of data storage operations, the method includes operating the logic circuitry to search the tokens to identify blocks of continuous available tokens to store data having a data length that determines how many continuous available tokens are needed to store the data, to select a block from the blocks identified in the search, to determine a first token for the selected block; and to output a memory address to the processor based upon the first token.

In additional embodiments, the plurality of storage operations are associated with data within packets received through a network, and the data length for each storage operation is associated with a data length for one of the received packets.

In additional embodiments, the method also includes, with the logic circuitry, generating a token vector having a bit for each token. In further embodiments, the logic state for the bit for each token indicates whether its associated section is available to store data.

In additional embodiments, the method also includes, with the logic circuitry, searching for continuous tokens having a same logic state to identify blocks of continuous available tokens to store the data. In further additional embodiments, with the logic circuitry, updating the tokens for the plurality of sections based upon tokens released by the processor. In still further embodiments, the method includes, with the logic circuitry, prioritizing processing of released tokens before searching for tokens to identify blocks of continuous available tokens.

In additional embodiments, the method includes, with the logic circuitry, selecting a smallest of the blocks identified in the search. In further additional embodiments, the method includes for each storage operation, with the logic circuitry, updating the tokens for the plurality of sections based upon the first token for the selected block.

In additional embodiments, the memory includes a plurality of segments available for storage of data, and the method further includes, with the logic circuitry, forming a plurality of sections within each segment based upon a programmable number of tokens and a programmable token size for each segment.

It is further noted that the functional blocks, components, systems, devices, and/or circuitry described herein can be implemented using hardware, software, or a combination of hardware and software. For example, the disclosed embodiments can be implemented using one or more programmable circuits that are programmed to perform the functions, tasks, methods, actions, and/or other operational features described herein for the disclosed embodiments. The one or more programmable circuits can include, for example, one or more processors and/or configurable logic devices (CLDs). The one or more processors can be, for example, one or more central processing units (CPUs), controllers, microcontrollers, microprocessors, hardware accelerators, ASICs (application specific integrated circuit), and/or other integrated processing devices. The one or more CLDs can be, for example, one or more CPLDs (complex programmable logic devices), FPGAs (field programmable gate arrays), PLAs (programmable logic array), reconfigurable logic circuits, and/or other integrated logic devices. Further, the programmable circuits, including the one or more processors, can be programmed to execute software, firmware, code, and/or other program instructions that are embodied in one or more non-transitory tangible computer-readable mediums to perform the functions, tasks, methods, actions, and/or other operational features described herein for the disclosed embodiments. The programmable circuits, including the one or more CLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. An integrated circuit, comprising:
   a memory comprising one or more segments available for storage of data;
   a processor coupled to the memory, the processor being configured to store data within the memory based upon memory addresses;
   logic circuitry coupled to the processor and the memory, the logic circuitry being configured for each of the one or more segments of the memory to:
     form a plurality of sections within the segment; and
     apply tokens to the plurality of sections, a different token being associated with each of the plurality of sections, and each token indicating whether its associated section is available to store data; and
   for each of a plurality of storage operations to:
     search the tokens to identify blocks of continuous available tokens to store data having a data length, the data length determining how many continuous available tokens are needed to store the data;
     select a block from the blocks identified in the search;
     determine a first token for the selected block; and
     output a memory address to the processor based upon the first token.

2. The integrated circuit of claim 1, wherein the plurality of storage operations are associated with data within packets received through a network, and wherein the data length for each storage operation is associated with a data length for one of the received packets.

3. The integrated circuit of claim 1, wherein the logic circuitry is further configured to generate a token vector having a bit for each token.

4. The integrated circuit of claim 3, wherein a logic state for the bit for each token is configured to indicate whether its associated section is available to store data.

5. The integrated circuit of claim 4, wherein the logic circuitry is configured to search for continuous tokens having a same logic state to identify blocks of continuous available tokens to store the data.

6. The integrated circuit of claim 1, wherein the logic circuitry is further configured to update the tokens for the plurality of sections based upon tokens released by the processor.

7. The integrated circuit of claim 6, wherein the logic circuitry is further configured to prioritize processing of released tokens before search for tokens to identify blocks of continuous available tokens.

8. The integrated circuit of claim 1, wherein the logic circuitry is further configured to select a smallest of the blocks identified in the search.

9. The integrated circuit of claim 1, wherein the logic circuitry is further configured for each storage operation to update the tokens for the plurality of sections based upon the first token for the selected block.

10. The integrated circuit of claim 1, wherein the memory comprises a plurality of segments available for storage of data, and wherein the logic circuitry is further configured to form a plurality of sections within each segment based upon a programmable number of tokens and a programmable token size for each segment.

11. A method to operate an integrated circuit, comprising:
    storing, with the processor, data within a memory based upon memory addresses, the memory comprising one or more segments available for storage of data;
    for each of the one or more segments of the memory, operating logic circuitry coupled to the processor and the memory to:
      form a plurality of sections within the segment; and
      apply tokens to the plurality of sections, a different token being associated with each of the plurality of sections, and each token indicating whether its associated section is available to store data; and for each of a plurality of data storage operations, operating the logic circuitry to:
search the tokens to identify blocks of continuous available tokens to store data having a data length, the data length determining how many continuous available tokens are needed to store the data;
select a block from the blocks identified in the search;
determine a first token for the selected block; and
output a memory address to the processor based upon the first token.

12. The method of claim 11, wherein the plurality of storage operations are associated with data within packets received through a network, and wherein the data length for each storage operation is associated with a data length for one of the received packets.

13. The method of claim 11, further comprising, with the logic circuitry, generating a token vector having a bit for each token.

14. The method of claim 13, wherein the logic state for the bit for each token indicates whether its associated section is available to store data.

15. The method of claim 11, further comprising, with the logic circuitry, searching for continuous tokens having a same logic state to identify blocks of continuous available tokens to store the data.

16. The method of claim 11, further comprising, with the logic circuitry, updating the tokens for the plurality of sections based upon tokens released by the processor.

17. The method of claim 16, further comprising, with the logic circuitry, prioritizing processing of released tokens before searching for tokens to identify blocks of continuous available tokens.

18. The method of claim 11, further comprising, with the logic circuitry, selecting a smallest of the blocks identified in the search.

19. The method of claim 11, further comprising for each storage operation, with the logic circuitry, updating the tokens for the plurality of sections based upon the first token for the selected block.

20. The method of claim 11, wherein the memory comprises a plurality of segments available for storage of data, and further comprising, with the logic circuitry, forming a plurality of sections within each segment based upon a programmable number of tokens and a programmable token size for each segment.

* * * * *